US009016182B2

(12) United States Patent
Seebauer

(10) Patent No.: US 9,016,182 B2
(45) Date of Patent: Apr. 28, 2015

(54) DEVICE AND METHOD FOR CUTTING THROUGH THE ADHESIVE BEAD OF PANES THAT HAVE BEEN FIXED BY BONDING

(75) Inventor: Ralf Seebauer, Murrhardt (DE)

(73) Assignee: C. & E. Fein GmbH (DE)

( * ) Notice: Subject to any disclaimer, the term of this patent is extended or adjusted under 35 U.S.C. 154(b) by 370 days.

(21) Appl. No.: 13/409,581

(22) Filed: Mar. 1, 2012

(65) Prior Publication Data

US 2012/0222527 A1 Sep. 6, 2012

(30) Foreign Application Priority Data

Mar. 3, 2011 (DE) ......................... 10 2011 013 790

(51) Int. Cl.

*B26D 1/547* (2006.01)
*B26D 3/00* (2006.01)
*B26D 7/28* (2006.01)
*B32B 38/10* (2006.01)
*B62D 65/08* (2006.01)

(52) U.S. Cl.

CPC ............. *B26D 1/547* (2013.01); *B60J 10/0088* (2013.01)

(58) Field of Classification Search

USPC .............. 83/13, 651.1, 367.1, 745, 39, 200.1, 83/614, 743, 744, 327, 373; 30/277.4, 30/116, 317, 372, 272.1, 314; 29/402.03, 29/281.1, 402.08; 296/201, 70; 156/250, 156/510, 762, 717, 927, 939, 344, 94, 98, 156/584

See application file for complete search history.

(56) References Cited

U.S. PATENT DOCUMENTS

| | | | | |
|---|---|---|---|---|
| 5,975,183 | A * | 11/1999 | Reis et al. | 156/580 |
| 6,101,702 | A * | 8/2000 | Claycomb et al. | 29/426.4 |
| 8,474,355 | B2 * | 7/2013 | Finck | 83/39 |
| 2007/0000361 | A1 * | 1/2007 | Ericson | 83/13 |
| 2007/0040415 | A1 * | 2/2007 | Ericson | 296/201 |
| 2008/0012349 | A1 * | 1/2008 | Finck | 292/70 |
| 2010/0132201 | A1 | 6/2010 | Klabunde et al. | |
| 2010/0132882 | A1 | 6/2010 | Hess et al. | |

FOREIGN PATENT DOCUMENTS

| | | | |
|---|---|---|---|
| DE | 3215892 | A1 | 11/1983 |
| DE | 4012207 | C1 | 10/1991 |
| DE | 102008060802 | A1 | 6/2010 |
| DE | 102008060812 | A1 | 6/2010 |

* cited by examiner

*Primary Examiner* — Ghassem Alie

(74) *Attorney, Agent, or Firm* — St. Onge Steward Johnston & Reens LLC

(57) ABSTRACT

A device and a method for cutting through the adhesive bead of panes that have been fixed by bonding is specified, said device having a base body on which at least one suction plate for fixing on a pane to be separated out as well as one motor-drivable coil for winding-on a separating wire are accommodated, wherein at least two guide rollers are held on the base body by means of extension arms at a distance which is adjustable in respect to each other. The device is preferably positioned approximately diagonally on the pane in such a manner that the guide rollers are situated on the outer ends of the extension arms in the vicinity of the corner regions of the pane.

9 Claims, 5 Drawing Sheets

DEVICE AND METHOD FOR CUTTING THROUGH THE ADHESIVE BEAD OF PANES THAT HAVE BEEN FIXED BY BONDING

CROSS REFERENCES TO RELATED APPLICATIONS

This application claims priority from German patent application 102011013790.4, filed on Mar. 3, 2011. The entire contents of this priority application is incorporated herein by reference.

BACKGROUND OF THE INVENTION

The invention relates to a device for cutting through the adhesive bead of panes that have been fixed by bonding, said device having a base body on which at least one suction plate for fixing on a pane to be removed as well as one motor-drivable coil for winding-on a separating means are accommodated.

The invention also relates to a method for cutting through the adhesive bead of panes that have been fixed by bonding, where a separating means is guided around the adhesive bead of the pane from the outside, the adhesive bead is pierced from the outside with at least one end of the separating means, a device, having a base body on which a motor-drivable coil for winding-on the separating means is accommodated, is fastened on the pane to be removed by means of at least one suction plate and the adhesive bead is cut through by winding the separating means on the coil.

A device of this type and a method of this type are known from DE 40 12 207 C1 and from DE 32 15 892 A1. In this case, a winding device is fastened on the pane to be removed with the aid of two suction plates. In addition, one guide roller each is fastened in the region of the two lower corners with the aid of a suction plate. A cutting wire is pushed with its two ends through the adhesive bead, is secured by way of one end and with the other end is guided around the guide rollers and around the adhesive bead and is finally fastened on a first coil of the winding device. By driving the coil, the cutting wire is then gradually pulled through the adhesive bead such that said bead is cut through. When the adhesive bead of approximately half the circumference of the pane is cut through, the wound end portion of the cutting wire is fixed and the other, previously fixed end portion is wound-on in order to cut through the other half of the pane in the same way. Two separate winding drums, which are drivable in opposite directions of rotation and are selectively lockable, are provided for this purpose. In this case, each winding drum receives one of the two end portions of the cutting wire.

A disadvantage of the known device and of the known method is that different winding devices have to be provided for winding-on the cutting wire in the one and in the other direction. In addition, the rearrangement after cutting through the one half of the adhesive bead is expensive.

DE 10 2008 060 812 A1 makes known a further device and a further method for cutting through the adhesive bead of panes that have been fixed by bonding. In this case, a winding device is fastened on the pane to be removed by way of a suction plate. A separating means is fixed by way of one end on the body of the vehicle, e.g. on the windscreen wiper shaft. The separating means is then guided around the outside of the adhesive bead to be cut through, pierces the adhesive bead and is fastened to a coil of the winding device. The winding device is accommodated so as to be rotatable on the suction plate such that said winding device is able to be aligned directly on the separating means when the separating means is wound-on. The adhesive bead is gradually cut through as the separating means is wound-on.

A disadvantage of the known device and of the known method is that the angle between the separating means and the adhesive bead for a large part of the adhesive bead to be cut through is clearly greater than 90°, which leads to a large amount of tensile loading on the separating means and brings about either a non-clean cut or in the case of extreme tensile loading can even lead to the separating means tearing.

SUMMARY OF THE INVENTION

In view of this, it is a first object of the invention to disclose a device for cutting through the adhesive bead of panes that have been fixed by bonding to a vehicle.

It is a second object of the invention to disclose a device for cutting through the adhesive bead of panes even when there is only a narrow gap between the pane and the flange on which the pane is fixed by bonding.

It is a third object of the invention to disclose a device for cutting through the adhesive bead of panes in a very a reliable manner.

It is a forth object of the invention to disclose a device for cutting through the adhesive bead of panes that can be easily adapted to different geometric conditions.

It is a fifth object of the invention to disclose a device for cutting through the adhesive bead of panes that allows for a time-saving operation even when handled by only one person.

It is a sixth object of the invention to disclose a method of cutting through the adhesive bead of panes fixed to a vehicle.

According to one aspect these and other objects are achieved by a device for cutting through the adhesive bead of panes that have been fixed by bonding, the device comprising:

- a base body;
- at least one suction plate supported on said base body for fixing on a pane to be removed;
- a motor-driven coil supported on said base body for winding-on a separating wire; and
- at least two guide rollers supported at a distance which is adjustable with respect to each other for guiding said cutting wire.

By at least two guide rollers being held on the base body by means of extension arms at a distance which is adjustable in respect to each other, it is possible, by winding-on the separating means, which is guided around the adhesive bead and the guide rollers, in only one direction, for the adhesive bead of a pane that has been fixed by bonding to be completely cut through in a gradual manner. In this case, the cutting angle between the adhesive bead and the separating means is less than 90° for the predominant part of the adhesive bead to be cut through, thereby ensuring a good cutting performance.

The extension arms can bet set beforehand in a suitable manner such that the guide rollers are situated in the vicinity of the edge of the pane to be removed, preferably in the vicinity of a corner region, preferably at a maximum spacing of 50 cm, in a more preferred manner a maximum of 30 cm, in particular a maximum of 20 cm.

Particularly good cutting conditions can be achieved in this way. The cutting angle is kept at less than 90° over large regions.

Within the context of this application, the term "separating means" refers to any wire or even any cord which, in principle, is suitable for cutting through the adhesive bead of a pane. This means that the separating means has to have sufficient tear strength and flexibility and, where applicable, is provided with a suitable coating or suitable surface features in the form of tooth attachments or the like in order to support the cutting operation, However, it is obvious that the term “separating means” can also refer to a suitable cord made of plastics material or the like.

According to a further development of the invention, suction plates for fastening on the pane are provided on the extension arms.

Secure fixing at a suitable spacing from the pane is made possible in this way.

According to a further development of the invention, at least one of the extension arms is accommodated on the base body so as to be extendible preferably by means of a telescopic device.

Good adjustability is made possible in this way.

According to a further development of the invention, the guide rollers protrude towards the outside in relation to the suction plates in such a manner that a separating means, which is guided around the adhesive bead of the pane from the outside and the one end of which is fixed and the other end of which is wound on the coil for cutting through the adhesive bead, when cutting through the adhesive bead, is guided through the guide rollers at a spacing from the base body and from the suction plates until the separating means has completely cut through the adhesive bead.

It is possible to work cleanly with a small amount of tensile loading on the separating means in this way.

According to a further development of the invention, a fastening device for fixing one end of the separating means is accommodated on the base body.

Particularly simple handling is made possible in this way as the separating means no longer then has to be fixed at an external fixed point, e.g. on the windscreen wiper shaft of the vehicle, but rather can be fastened on the base body with the aid of the fastening device in a simple manner, e.g. by clamping.

According to a further development of the invention, at least one of the extension arms is accommodated so as to be pivotable on the base body.

A pivotable fastening of at least one or several extension arms on the base body simplifies adaptation of the device to the curvature of a pane to be removed, as is present, as a rule, in the case of windscreens. In this case, the pivotal axis is preferably arranged in such a manner that the extension arm can be pivoted out of the main extension plane of the basic carrier. A pivoting device of this type is advantageous in order to enable good adaptation to curved pane surfaces.

According to a further development of the invention, a carrier on which at least one guide roller is mounted, is held at the free end of at least one extension arm.

In this case, at least two guide rollers can be provided on the extension arm or on the carrier.

In this case, a suction plate for fixing a pane is preferably provided on the carrier.

Advantageous positioning of the device on a pane to be removed is possible in this way, it being possible, in addition, to achieve particularly favourable geometric conditions by means of the different guide rollers.

According to a further development of the invention, at least one suction plate is fastened so as to be pivotable and/or interchangeable.

In addition, it is preferred that at least one extension arm is fastened so as to be interchangeable.

This measure produces a particularly good adaptation possibility to different pane sizes and different geometric conditions, it also being possible by exchanging the suction plate, a guide roller or an extension arm, to adapt to smaller panes (e.g., side panes).

According to a further development of the invention, the guide rollers are accommodated directly on the base body.

To this end, the extension arms, for instance, can be removed from the base body and the guide rollers can then be fastened directly on the base body. This is expedient in order to be able to remove very small panes.

The object of the invention is also achieved by a method for cutting through the adhesive bead of panes that have been fixed by bonding, said method having the following steps:

- fixing a device, having a base body on which a motor-drivable coil for winding-on the separating means is accommodated, on the pane to be removed by means of at least one suction plate;
- guiding a separating means around the adhesive bead of the pane from the outside;
- piercing the adhesive bead from the outside with at least one end of the separating means;
- guiding the separating means around two guide rollers held on extension arms and fasten it to the coil;
- fastening the other end of the separating means to a fixed point or to the device;
- cutting through the adhesive bead by winding the separating means on the coil until the adhesive bead is completely cut through.

Through the method according to the invention, the adhesive bead of a pane that has been fixed by bonding can be cut through completely little by little by winding-on the separating means in only one direction on a coil without a rearrangement or interruption being necessary between different operating steps. Through the guide rollers, in this case, optimum positioning of the device on the pane to be removed is possible, such that it is possible to work at a favourable cutting angle which is less than 90° over large parts of the adhesive bead to be removed.

The steps provided do not necessarily have to be performed in this sequence but can also be carried out in other sequences, e.g. first of all one end of the separating means could pierce the adhesive bead and be fastened on the fastening device before the separating means is guided around the adhesive bead of the pane from the outside and the adhesive bead is pierced by said end.

The device with the two extension arms is preferably fastened approximately diagonally on the pane to be removed. In this way, the extension arms can be extended in such a manner that the guide rollers are situated in the vicinity of the edge of the pane to be removed, preferably in each case in the vicinity of a corner region.

In this way, a particularly rapid cutting through of the adhesive bead is made possible over the entire circumference, the tensile loading on the separating means remaining relatively small.

It is obvious that the aforementioned features of the invention and the features of the invention yet to be mentioned below are usable not only in the combination specified in each case, but also in other combinations of the invention or standing alone without departing from the framework of the invention.

BRIEF DESCRIPTION OF THE DRAWINGS

Further features and advantages of the invention are produced from the following description of a preferred exemplary embodiment with reference to the drawing, in which.

DETAILED DESCRIPTION OF PREFERRED EMBODIMENTS

Figure 1:
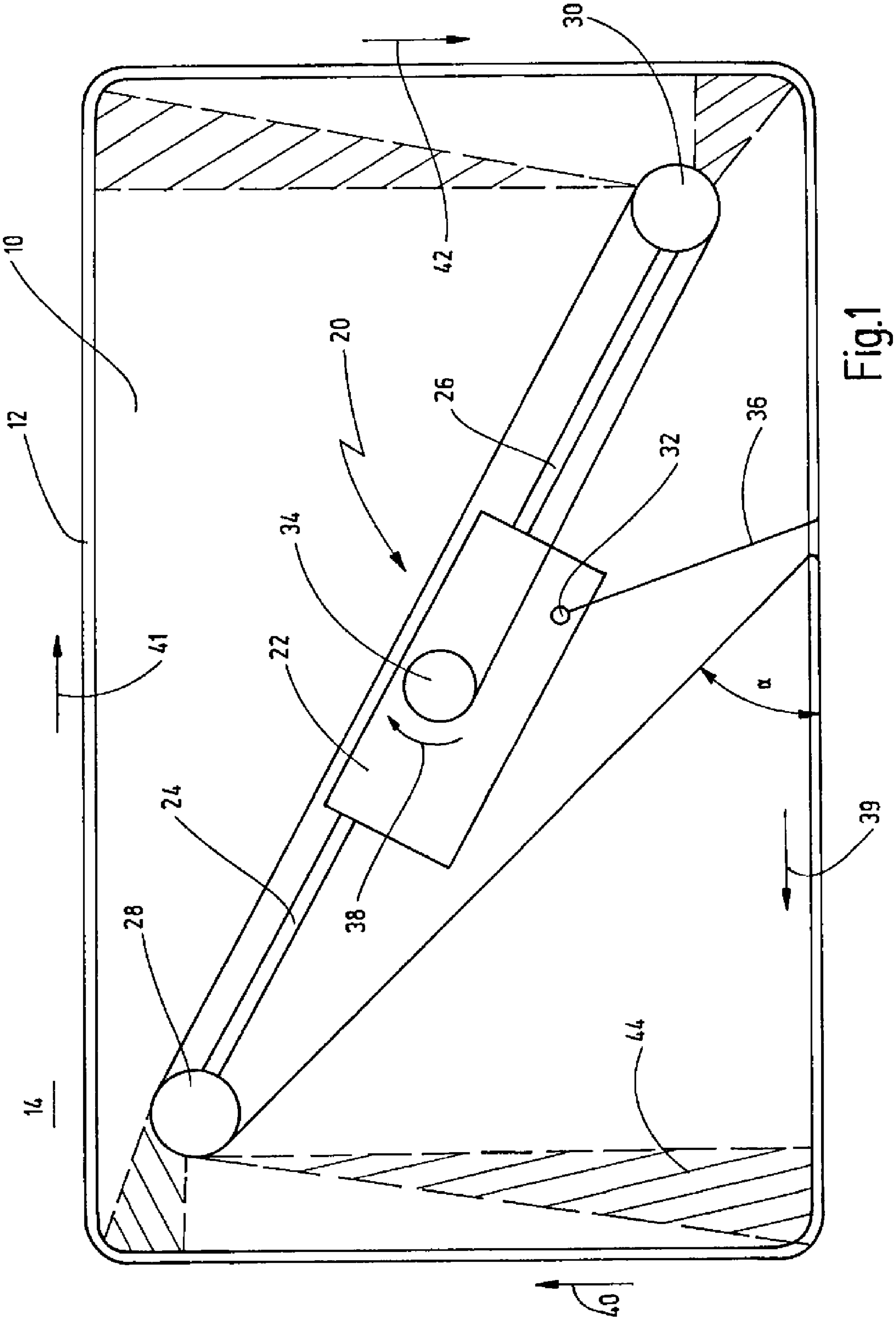
FIG. 1 shows a schematic representation of a device according to the invention in use on a windscreen, the working conditions of the separating means on the adhesive bead being visible in particular.

The principle method of operation of the device according to the invention may be explained initially by way of FIG. 1.

FIG. 1 shows a pane 10 in the view from the outside, said pane has been fixed from the outside by bonding onto a vehicle body flange 14 by means of a circumferential bead 12. The adhesive bead 12 is a very tough material, for instance based on polyurethane. There is only a very narrow gap between the adhesive bead 12 and the circumferential vehicle body flange 14. If a pane 10 of this type has to be replaced, for instance as a result of a stone damaging the windscreen, the adhesive bead 12 has to be cut through completely, it being important, in particular, not to damage the circumferential vehicle body flange 14, so that once a new pane has been fixed by bonding again there are no disadvantageous influences to be feared, for instance caused by rust.

According to the invention, the cutting through of the adhesive bead 12 is effected with the aid of a separating means 36 in the form of a wire, the arrangement being set up such that by means of one single operation the adhesive bead 12 can be cut through completely without the device 20 according to the invention having to be removed or adjusted for this purpose.

FIG. 1 shows the pane 10 from the outside, whilst the device 20 according to the invention is fastened on the pane 10 from the inside with the aid of suction plates (not shown). The device 20 has a base body 22 on which a motor-drivable coil 34 is provided. In addition, two extension arms 24, 26 are accommodated on the base body 22 so as to be extendible, on the outer ends of which, in each case, one or several guide rollers 28, 30 being provided, for reasons of simplicity in each case only one guide roller 28 or 30 being shown at the outer end of the extension arm 24 or 26 in FIG. 1. In addition, a fastening device 32 is accommodated on the base body 22 for fixing one end of the separating means 36.

In the region of the lower end of the pane 10, the separating means 36, by way of one end, is pushed from the outside through the adhesive bead 12, for which purpose, for instance, a hollow needle can be used, and is fixed to the fastening device 32. The separating means 36 is then guided from the outside completely around the adhesive bead 12 and is then, by way of its other end, also pushed through the adhesive bead 12 and is then guided around the guide rollers 28, 30 of the device 20 and is finally fastened to the coil 34 so that the separating means is able to be wound-on.

The device 20 has been fastened beforehand to the inside of the pane 10 preferably in the diagonal direction in such a manner that the guide rollers 28, 30 are situated at only a small spacing from the edges of the pane 10, that is to say, for example, at a spacing of, for instance, 10 to 20 cm from the respective edges in the corner regions. To this end, the extension arms 24, 26 have been extended and fixed in a suitable manner in order to achieve as optimum a fixing as possible.

By positioning the device 20 in such a manner in the diagonal direction and with its guide rollers 28, 30 in the vicinity of the corner regions, it can be ensured that the removal angle, which is produced between the separating means 36 and the adhesive bead 12, is smaller than 90° over wide regions of the adhesive bead 12. An angle of less than 90° is preferred as in this way a good cutting performance and a relatively small loading on the separating means 36 is produced. If the angle is greater than or equal to 90°, clearly increased tensile forces and a less good removal performance are produced.

In FIG. 1, the regions in which the separating angle is greater or equal to 90° are indicated in a hatched manner and given the reference 44. It is obvious that these regions are all the smaller, the closer the guide rollers 28, 30 are situated to the corner regions.

Using the device according to the invention or the method according to the invention, a complete cutting through of the adhesive bead 12 can be achieved in one operation without the device 20 having to be removed or adjusted for this purpose, at the same time an advantageous cutting effect of the separating means 36 being ensured predominantly over the entire region. The arrows 39, 40, 41, 42 indicate the progress of the removal operation in a schematic manner, i.e. the separating means 36 is pulled through the adhesive bead 12 little by little from its initial position shown in FIG. 1, in which the angle is indicated, by winding-on the coil 34 in a clockwise manner in the direction of the arrow 38 through the adhesive bead 12. The cutting line created by the separating means 36 is moved, therefore, from the starting point little by little along the outer circumference of the pane 10 in the direction of the arrows 39, 40, 41, 42 until the separating means 36 is finally pulled-in again to the coil 34.

The design of the device 20 is explained in more detail below by way of FIGS. 2 to 5.

Figure 2:
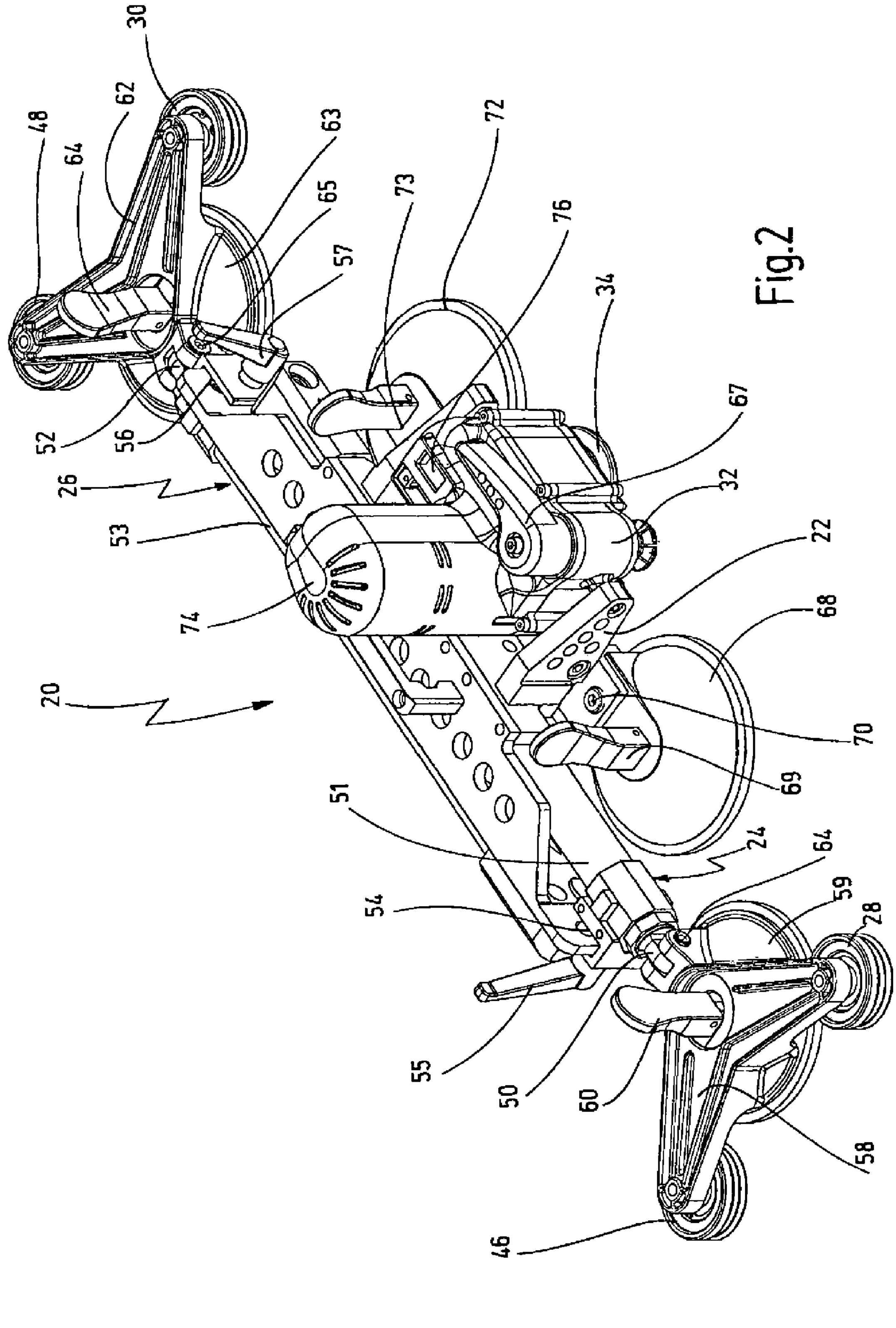
FIG. 2 shows a perspective view of a device according to the invention.
Figure 3:
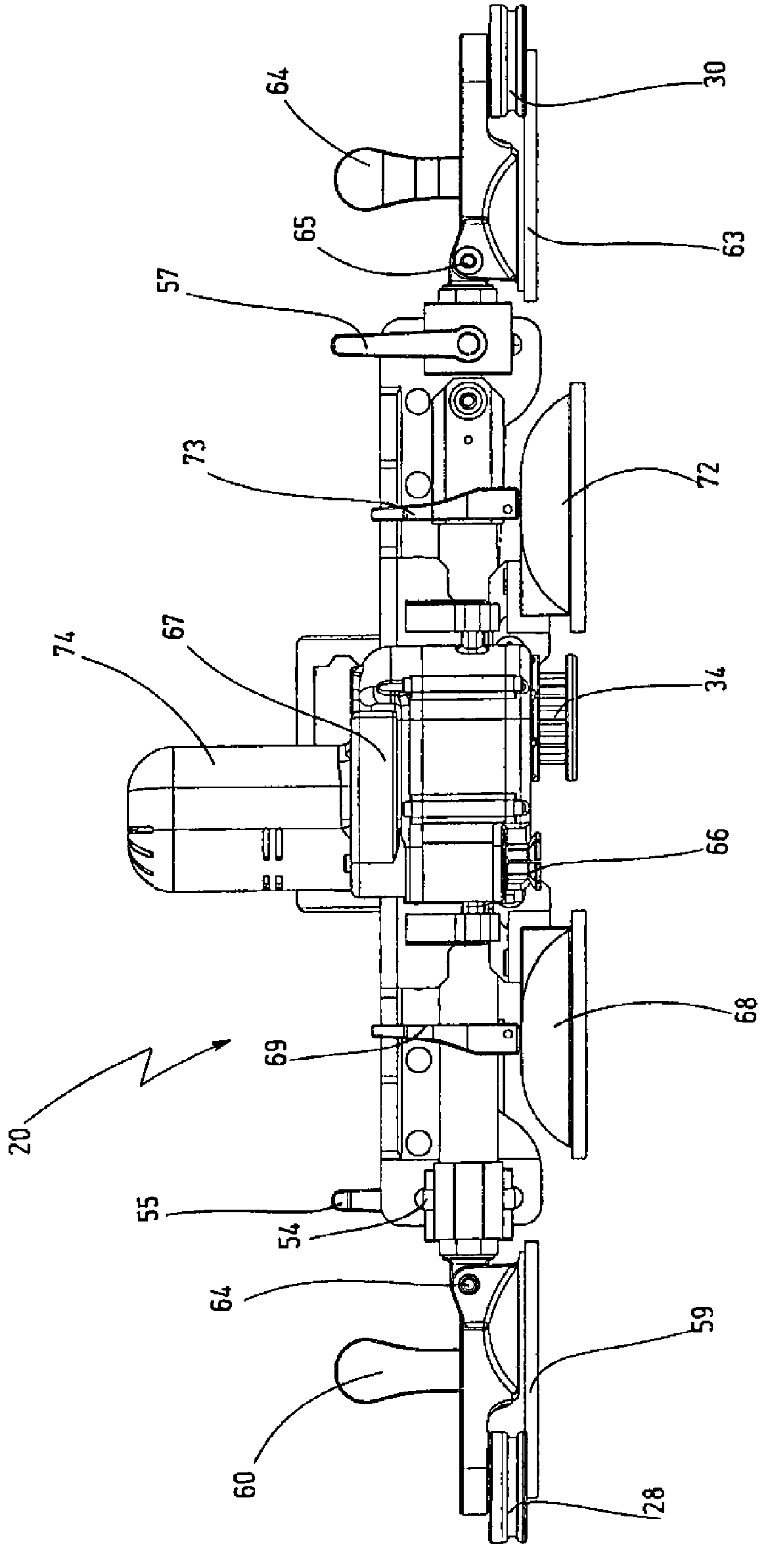
FIG. 3 shows a side view of the device according to the invention according to FIG. 2.
Figure 4:
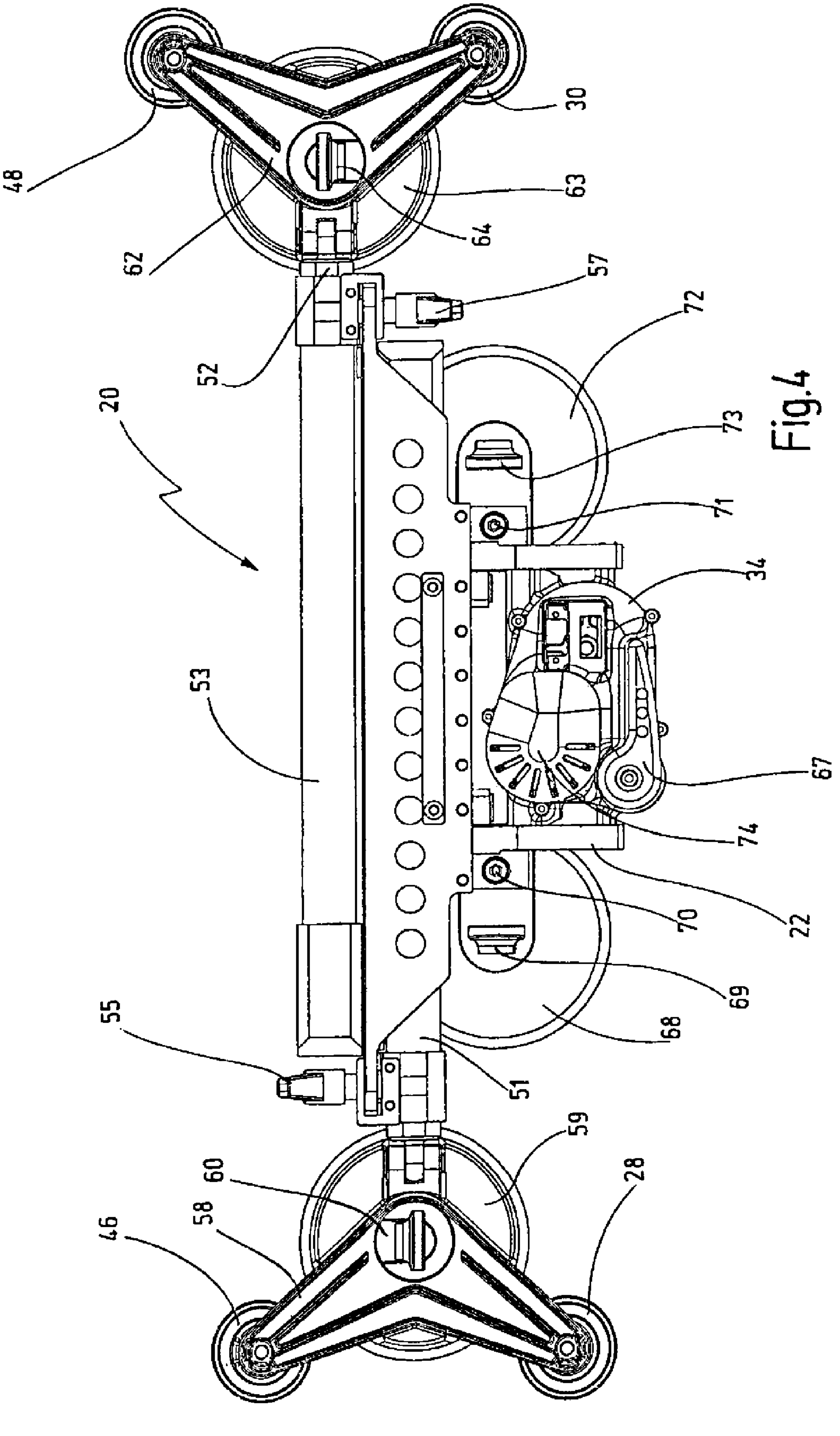
FIG. 4 shows a view from above of the device according to FIG. 3.

According to FIG. 2, each of the two extension arms 24, 26 is extendible outwards by means of a telescopic device. The extension arm 24 has a telescopic rod 50, which is guided in a telescopic bearing 51 or is extendible out of said bearing. A suction plate 59 is fastened at the outer end of the telescopic rod 50 by means of a pivot bearing 64, said suction plate being connected to a triangular carrier 58. The suction plate 59 can be fastened to the pane 10 by means of a lever 60, by means of which a negative pressure can be generated. Two guide rollers 28, 46 are provided at the outer ends of the carrier 58. The telescopic bearing 51 is pivotably fixed on the basic carrier 22 at one end (not shown) and at its other end is adjustably accommodated by way of a slot 54 and a clamp 55 cooperating therewith in such a manner that the extension arm 24 is able to be pivoted out of a main extension plane of the basic carrier 22 (cf. FIG. 5). The second extension arm 26 is designed in a corresponding manner and has a telescopic rod 52, which is held within a telescopic bearing 53 so as to be extendible, the telescopic bearing 53 being adjustably held once again at its outer end at a slot 56 by way of a clamp 57 and at its other end being pivotably accommodated on the basic carrier 22. At the outer end of the telescopic rod 52, a suction plate 63 is once again pivotably accommodated by means of a pivot bearing 65 and is coupled to a triangular carrier 62. A guide roller 30 or 48 is accommodated in each case at the outer ends of the carrier 62. The suction plate 63 can be fastened to the pane 10 by means of negative pressure by way of a lever 64.

In addition, two suction plates 68, 72 are spaced apart from each other on the base body 22, said suction plates being fastened to the base body 22 by means of pivot bearings 70, 71. The suction plates 68, 72 can be fastened to the pane 10 by means of levers 69 or 73 by means of negative pressure.

In addition, the coil 34 is accommodated on the base body 22 between the two suction plates 68, 72, said coil being motor-drivable by means of a drive 74. The fastening device

32 for the separating means 36 is also fastened next to the coil 34 on the base body. The fastening device 32 has an expanding clamp 66 with a row of slots into which one end of the separating means 36 can be inserted and can be clamped on the expanding clamp 66 by way of an actuating lever 67.

Figure 5:
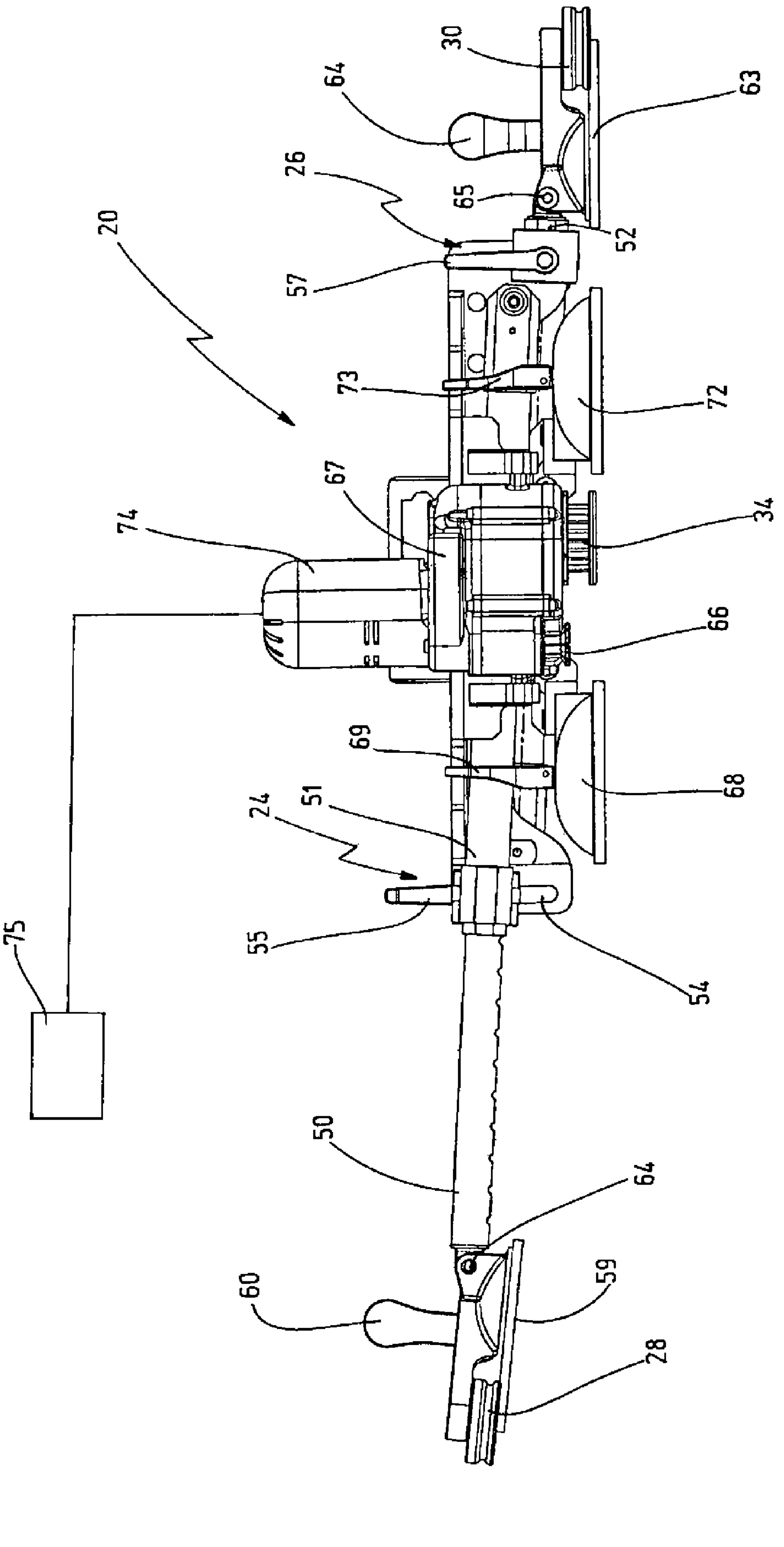
FIG. 5 shows a side view of the device according to FIG. 3, one of the extension arms being partly extended.

At the start of the removal operation, the device 20 is fastened in a suitable manner on the inner side of the pane 10 by way of the two suction plates 68, 72 and the extension arms 24, 26 are then extended so far that the guide rollers 28, 46 or 30, 48 are situated in the direct vicinity of the corner regions. In order to enable adaptation to the curvature of the pane 10 to be removed, the extension arms 24, 26 can be pivoted in this case, as is indicated in FIG. 5 by way of the one extension arm 24. Further adaptation to the pane curvature is made possible by means of the pivotable connection of the suction plates 59 or 63 to the telescopic rods 50 or 52.

The actuation of the drive 74 for winding the separating means 36 on the coil 34 is preferably effected by means of a remote control unit, to which end a connection 76 (cf. FIG. 2) can be provided on the base body 22. On the remote control unit (only shown at 75 in FIG. 5), which is preferably wire-connected, there is an accelerator switch, by means of which the drive 74 can be actuated and, depending on the depressing of the actuating key, the speed is able to be modified.

If the device 20 is to be used for removing small panes, as, for example, are used in the side regions of vehicles, the telescopic rods 50, 52 with the carriers and suction plates accommodated thereon can be removed and exchanged for smaller units.

What is claimed is:

1. A device for cutting through adhesive beads of panes that have been fixed by bonding to a vehicle, the device comprising:
- a base body;
- a motor-driven coil supported on said base body for winding-on a separating wire;
- at least two extension arms supported on said base body and adjustably extendable with respect to said base body;
- at least two guide rollers supported on at least one of said extension arms for guiding said separating wire;
- at least two suction plates for fastening on the pane, at least one suction plate being supported on each of said extension arms; and
- a securing aid on said base body for securing one end of said separating wire;
- wherein at least one of said extension arms is held pivotably on said base body; and
- wherein said separating wire is guided at least around said guide rollers and said motor-driven coil.

2. The device of claim 1, wherein at least one of said guide rollers is supported on said base body.

3. The device of claim 1, further comprising a carrier held at the free end of at least one of said extension arms for mounting at least one guide roller thereon.

4. The device of claim 1, wherein at least one suction plate is fastened to said base body pivotably or interchangeably.

5. The device of claim 1, wherein at least one element selected from the group consisting of one of said extension arms and one of said guide rollers is fastened interchangeably.

6. The device of claim 1, further comprising a motor-drive and a remote control for controlling said motor-drive.

7. The device of claim 1, where at least two guide rollers are secured directly on said base body.

8. The device of claim 1, wherein guide rollers are arranged on each outer end of said extension arms, so as to allow guiding said cutting wire around said guide rollers when cutting through said adhesive bead while reeling-in said cutting wire.

9. The device of claim 8, wherein each extension arm comprises two carrier arms extending from said extension arm to the outside, each carrier arm carrying a guide roller at a free end thereof.

* * * * *